United States Patent Office 3,470,254
Patented Sept. 30, 1969

3,470,254
PROCESS FOR PREPARING TERTIARY PHOSPHINES IN THE PRESENCE OF ETHER SOLVENTS
Ingenuin Hechenbleikner, Cincinnati, Ohio, and Edward J. Lanpher, Hampstead, N.H., assignors to Carlisle Chemical Works, Inc., Reading, Ohio, a corporation of Ohio
No Drawing. Filed Sept. 15, 1967, Ser. No. 668,169
Int. Cl. C07f 9/50, 9/52
U.S. Cl. 260—606.5          18 Claims

ABSTRACT OF THE DISCLOSURE

Trihydrocarbyl (or alkoxyaryl) phosphines are prepared by reacting a hydrocarbyl (or alkoxyaryl) chloride or bromide with a tertiary phosphite, a phosphinite or a phosphonite and sodium. The reaction is particularly useful in preparing phosphines from secondary alkyl chlorides or benzyl chloride.

---

The present invention relates to the preparation of phosphines.

It is known to prepare tertiary phosphines by the reaction of an alkyl halide with sodium and a tertiary phosphite in the presence of a hydrocarbon solvent, Hechenbleikner Patent 3,223,736. Such process gives good yields when primary alkyl chlorides having at least four carbon atoms are employed. However, it is not possible to obtain as high yields as desired of aromatic phosphines of good purity. Also, the process is unsatisfactory for the preparation of phosphines from secondary or tertiary alkyl halides. Additionally, alkyl halides of 1 to 3 carbon atoms only react sluggishly while allyl and methallyl halides and benzyl halides do not react at all in such hydrocarbon solvents. Cycloalkyl halides also only give poor yields when such solvents are employed. Additionally, it is frequently necessary to use substantially elevated temperatures to make the reaction go at all in hydrocarbon solvents with attendant poor yields of the desired phosphines.

Accordingly, it is an object of the present invention to obtain tertiary phosphines in good yields.

Another object is to prepare tertiary phosphines which cannot be prepared satisfactorily in a hydrocarbon solvent.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing an ether as a solvent for the following reaction:

$$(RO)_nP(R_1)_m + nR_2X + 2nNa \rightarrow (R_2)_nP(R_1)_m + nNaX + nRONa$$

where R is alkyl, cycloalkyl or aryl, $R_1$ is alkyl, cycloalkyl or aryl, $R_2$ is alkyl, alkenyl of 3 to 4 carbon atoms, cycloalkyl, aryl or alkoxyaryl, X is a halogen of atomic weight 35 to 80, $n$ is an integer from 1 to 3, $m$ is an integer from 0 to 2 and the total of $n+m$ is 3.

Preferably X is chlorine. $R_2$ is preferably cycloalkyl or sec. alkyl, allyl, methallyl, alkyl of 1 to 3 carbon atoms or aryl since it has been found that when $R_2$ is one of these groups the reaction goes smoothly and good yields of the desired tertiary phosphine are obtained using an ether solvent whereas when hydrocarbon solvents are employed, the yields are poor or, in some instances, nil.

It is surprising that the present reaction goes smoothly in ethers since sodium alkyl and sodium phenyl are known to cleave ethers.

While the reactants can be employed in the stoichiometric amounts indicated by Equation I, it has been found preferable to employ a slight excess of the sodium and the $R_2X$ compound. Usually, the excess is not over 10%. The amount of solvent is not critical. There need be only enough to keep the mixture stirrable. A large excess of solvent can be employed, e.g., 5 liters for 1 mole of $R_2X$ compound, but there is no advantage in doing so and, of course, the expense in recovering solvent is increased.

While the reaction can be carried out at temperatures as high as 60° C., preferably the temperature is kept at room temperature (20–25° C.) and below, e.g., 0° C. or even —20° C.

In general, as the temperature goes up the yield goes down and side reactions occur. Consequently, for best results, the temperature is kept near the lowest point at which the reaction will occur.

Mixed phosphines can be prepared if a mixture of $R_2X$ compounds are employed in which the $R_2$ groups are different or if the reactant contains an $R_1$ group which is different from the $R_2$ group in the $R_2X$ compound.

As the $(RO)_nP(R_1)_m$ compound there can be used tertiary phosphites such as trimethyl phosphite, triethyl phosphite, tributyl phosphite, trioctyl phosphite, tri sec. butyl phosphite, tris decyl phosphite, triphenyl phosphite, tri p-cresyl phosphite, tri cyclohexyl phosphite, tri benzyl phosphite, diphenyl decyl phosphite, tri xylenyl phosphite, tri p-butylphenyl phosphite; phosphonites such as diphenyl phenyl phosphonite, O,O-dimethyl phenyl phosphonite

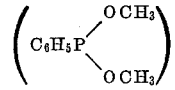

O,O-dioctyl phenyl phosphonite, O,O-dimethyl allyl phosphonite, O,O-dibutyl butyl phosphonite, O,O-diethyl butyl phosphonite, O,O-dimethyl cyclohexyl phosphonite, O,O-dipropyl methyl phosphonite; phosphinites such as O-methyl diphenyl phosphinite, O-phenyl diphenyl phosphinite, O-butyl dibutyl phosphinite, O-ethyl dimethyl phosphinite, O-methyl dicyclohexyl phosphinite, O-ethyl dimethallyl phosphinite.

As the $R_2X$ compound there can be employed methyl chloride, ethyl chloride, isopropyl chloride, n-propyl chloride, n-butyl chloride, sec. butyl chloride, cyclohexyl chloride, allyl chloride, methallyl chloride, cyclopentyl chloride, 2-methylcyclohexyl chloride, benzyl chloride, chlorobenzene, 2-chlorotoluene, 3-chlorotoluene, 4-chlorotoluene, p-chloro butylbenzene, octyl chloride, t-butyl chloride, amyl chloride, sec. amyl chloride, hexyl chloride, 2-chlorohexane, 3-chlorohexane, 2-chloroheptane, 4-chloroheptane, heptyl chloride, 2-chlorooctane, 2-chlorodecane, α - naphthyl chloride, β - naphthyl chloride, 2-chloroanisole, sec. butyl bromide, allyl bromide, cyclohexyl bromide, methyl bromide, octadecyl chloride, decyl chloride.

The ethers which can be employed as solvents are saturated aliphatic and saturated heterocyclic ethers having a ring of more than four carbon atoms. Thus, there can be employed cyclic acetals and ketals. There can also be employed ethers of glycols and polyoxyalkylenes. Examples of suitable ethers are butyl ethyl ether, sec. butyl ethyl ether, t-butyl ethyl ether, ethyl isoamyl ether, isobutyl ethyl ether, ethyl t-amyl ether, butyl isobutyl ether, butyl isopropyl ether, butyl methyl ether, sec. butyl methyl ether, 2-methylbutyl methyl ether, t-butyl methyl ether, isoamyl methyl ether, butyl propyl ether, isoamyl propyl ether, cyclohexyl methyl ether, dibutyl ether, di sec. butyl ether, diisoamyl ether, butyl isoamyl ether, diethyl ether, diheptyl ether, dihexyl ether, diisopropyl ether, dimethyl ether, dioctyl ether, diamyl ether, dipropyl ether, ethyl heptyl ether, ethyl hexyl ether, ethyl isobutyl ether, ethyl isopropyl ether, ethyl methyl ether, amyl ethyl ether, ethyl propyl ether, heptyl methyl ether, isobutyl methyl ether, isobutyl propyl ether, isopropyl methyl ether, isopropyl propyl ether, methyl amyl ether, dicyclohexyl ether, methyl propyl ether, tetrahydrofuran, 2-methyl tetrahydrofurane, diethylene glycol diethyl ether, diethylene glycol dimethyl ether, ethylene glycol dimethyl ether, ethylene glycol diethyl ether, 1,4-dioxane, 1,3-dioxane, 1,3-dioxolane, 2-methyl-1,3-dioxolane, 2,2-dimethyl-1,3-dioxolane, 2,4-dimethyl-1,3-dioxane, 2,2-dimethyl-1,3-dioxane, 4-methyl-1,3-dioxane, propylene glycol dimethyl ether, dipropylene glycol diethyl ether, triethylene glycol dimethyl ether, 2,2-diethyl-1,3-dioxolane, 2-methyl-2-ethyl-1,3-dioxolane, tetraethylene glycol dimethyl ether, cyclohexanedimethanol dimethyl ether, 1,4-cyclohexanediol diethyl ether.

In general, the suitable ethers are composed of carbon, hydrogen, and oxygen and are free of unsaturation.

Illustrative of phosphines which can be prepared according to the invention are trimethyl phosphine, triethyl phosphine, tripropyl phosphine, tributyl phosphine, tri sec. butyl phosphine, triisobutyl phosphine, tri t-butyl phosphine, triamyl phosphine, tri sec. amyl phosphine, trihexyl phosphine, tri 1-methyl pentyl phosphine, tricyclohexyl phosphine, triallyl phosphine, trimethyallyl phosphine, tri 2-methyl cyclohexyl phosphine, tri benzyl phosphine, triphenyl phosphine, tri 2-methyl phenyl phosphine, tri 3-methylphenyl phosphine, tri 4-methylphenyl phosphine, trioctyl phosphine, tri 1-ethyl butyl phosphine, tri 1-methyl hexyl phosphine, tri 1-propyl butyl phosphine, triheptyl phosphine, tri 1-methyl heptyl phosphine, tri 1-methyl nonyl phosphine, tris octadecyl phosphine, tris decyl phosphine, tri α-naphthyl phosphine, tri β-naphthyl phosphine, tris (o-methoxyphenyl) phosphine, tris (p-ethoxyphenyl) phosphine, tricyclopentyl phosphine, diethyl phenyl phosphine, dimethyl phenyl phosphine, ethyl diphenyl phosphine, di sec. butyl phenyl phosphine, diethyl isopropyl phosphine, diamyl phenyl phosphine, o-tolyl diphenyl phosphine, dicyclohexyl phenyl phosphine, cyclohexyl dihexyl phosphine.

Unless otherwise indicated, all parts and percentages are by weight.

Example 1

A solution consisting of 86 grams of isopropyl chloride and 93 grams of triphenyl phosphite was added dropwise to 51 grams of sodium in 500 ml. of dibutyl ether at 50–55° C. The reaction mixture was stirred for one hour after addition was completed, and then water was added and the organic layer separated. The dibutyl ether layer was fractionated to yield 60 grams of pure triisopropyl phosphine with a B.P. 170–175° C.

Example 2

84 grams of ethyl chloride, together with 37 grams of trimethyl phosphite, were added dropwise to 51 grams of sodium dispersed in tetrahydrofurane at 20–25° C. After addition of water for hydrolysis, separation of the organic layer and fractionation there were obtained 18 grams (50% yield) of pure triethyl phosphine B.P. 128° C.

Example 3

A solution consisting of 65 grams of cyclohexyl chloride plus 46 grams of trimethyl phosphite was added to 26 grams of sodium dispersed in dibutyl ether at 20–25° C. After hydrolysis with water and separation of the organic layer an aliquot was added to carbon disulfide to form a stable adduct of the phosphine. Tricyclohexyl phosphine was obtained in a yield of 90%.

In contrast, when the temperature was increased to 50° C. the yield of tricyclohexyl phosphine dropped to 45–50%. When the dibutyl ether was replaced by aliphatic hydrocarbon solvents the yields of tricyclohexyl phosphine dropped to 30–35%.

Example 4

3 moles of chlorobenzene mixed with 1 mole of trimethyl phosphite was added to 700 ml. of dibutyl ether in which there were dispersed 6.2 grams of sodium at a temperature of 0–10° C. After addition was complete the reaction mixture was washed with water and the organic layer distilled. The yield of pure triphenyl phosphine was 240 grams or 91% of theory.

In contrast, chlorobenzene and trimethyl phosphite will not react in benzene or heptane below 60° C. and the yields of the desired product are reduced while increased amounts of impurities are obtained.

Example 5

277.5 g., 3 moles of sec. butyl chloride and 310 g., 1 mole of triphenyl phosphite were added to 138 grams of sodium dispersed in 800 ml. of dibutyl ether at 0–10° C. The product was worked up in the manner set forth in Example 1 to obtain pure tri sec. butyl phosphine in considerably increased yields over that which could be obtained using hydrocarbon solvents.

Example 6

219.5 g., 3 moles of allyl chloride and 310 g., 1 mole of triphenyl phosphite were added to 138 grams of sodium dispersed in 900 ml. of diethylene glycol dimethyl ether at 10–15° C. to obtain pure tri allyl phosphine in fair yields after working up as in Example 1. In contrast, allyl chloride would not react with triphenyl phosphite at all when using hydrocarbon solvents with the sodium.

Example 7

277.5 g., 3 moles of butyl chloride and 310 g., 1 mole of triphenyl phosphite were added to 138 grams of sodium dispersed in 1000 ml. of ethylene glycol formal (1,3-dioxolane) at 0–10° C. to obtain pure tributyl phosphine is good yields after working up as in Example 1.

Example 8

379.5 g., 3 moles of benzyl chloride and 310 g., 1 mole of triphenyl phosphite were added to 138 grams of sodium dispersed in 1500 ml. of tetrahydrofuran at 15–10° C. to obtain pure tribenzyl phosphine in fair yields after working up as in Example 1. In contrast, benzyl chloride would not react with triphenyl phosphite when hydrocarbon solvents with the sodium were employed.

Example 9

2.13 moles of ethyl chloride, 1 mole of O,O-dimethyl phenyl phosphonite and 4, 27 gram atoms of sodium in 500 ml. of dibutyl ether were reacted at 10–15° C. and the product was worked up in the manner set forth in Example 1 to obtain pure diethyl phenyl phosphine as the product.

Pertinent art

Niebergall—2,959,621, Nov. 8, 1960; Henderson—3,029,289, Apr. 10, 1962; Hettinger—3,079,311, Feb. 26, 1963; Hechenbleikner—3,223,736, Dec. 14, 1965.

What is claimed is:
1. In a process of preparing a phosphine having the formula $(R_2)_nP(R_1)_m$ by reacting sodium with a mixture of a compound having the formula $R_2X$ and a compound having the formula $(RO)_nP(R_1)_m$ where R is alkyl, cycloalkyl or aryl, $R_1$ is alkyl, cycloalkyl or aryl, $R_2$ is alkyl, alkenyl of 3 to 4 carbon atoms, cycloalkyl, aryl or alkoxyaryl, X is a halogen of atomic weight 35 to 80, $n$ is an integer from 1 to 3, $m$ is 0 or an integer from 1 to 2 and the total of $n+m$ is 3, the improvement comprising carrying out the process at a temperature not over 60° C. in the presence of a solvent which is an ether of the group consisting of saturated aliphatic ethers and heterocyclic ethers, said ether being composed of carbon, hydrogen and ether oxygen.

2. A process according to claim 1 where $m$ is 0.

3. A process according to claim 2 wherein $R_2X$ is cyclohexyl chloride.

4. A process according to claim 3 wherein the temperature is not above 25° C.

5. A process according to claim 2 wherein $R_2X$ is alkyl chloride having 1 to 3 carbon atoms in the alkyl group.

6. A process according to claim 5 wherein the temperature is not above 25° C.

7. A process according to claim 2 wherein $R_2X$ is a secondary alkyl chloride.

8. A process according to claim 7 wherein the temperature is not above 25° C.

9. A process according to claim 2 wherein $R_2X$ is a chlorobenzene having up to one lower alkyl group on the benzene nucleus.

10. A process according to claim 9 wherein $R_2X$ is chlorobenzene per se.

11. A process according to claim 10 wherein the temperature is not above 25° C.

12. A process according to claim 11 wherein the temperature is 0–10° C. and $(RO)_nP(R_1)_m$ is tris lower alkyl phosphite.

13. A process according to claim 1 wherein $m$ is 1.

14. A process according to claim 1 wherein $m$ is 2.

15. A process according to claim 1 wherein the ether is an aliphatic monoether.

16. A process according to claim 1 wherein the ether is an aliphatic polyether.

17. A process according to claim 1 wherein the ether is a heterocyclic ether.

18. A process according to claim 1 carried out at a temperature of not over 10° C.

References Cited

UNITED STATES PATENTS

| | | | |
|---|---|---|---|
| 2,959,621 | 11/1960 | Niebergall | 260—606.5 |
| 3,029,289 | 4/1962 | Henderson | 260—606.5 |
| 3,079,311 | 2/1963 | Hettinger | 260—606.5 |
| 3,223,736 | 12/1965 | Hechenbleikner et al. | 260—606.5 |
| 3,064,053 | 11/1962 | Rabinowitz | 260—606.5 |
| 3,264,355 | 8/1966 | Cannon | 260—606.5 |
| 3,267,149 | 8/1966 | Garner | 260—606.5 |
| 3,340,333 | 9/1967 | Baranauckas et al. | 260—606.5 X |
| 3,409,707 | 11/1968 | Grayson et al. | 260—606.5 X |
| 3,420,917 | 1/1969 | Wu | 260—606.5 X |

TOBIAS E. LEVOW, Primary Examiner

W. F. W. BELLAMY, Assistant Examiner